(12) United States Patent
Bunker

(10) Patent No.: US 10,450,867 B2
(45) Date of Patent: Oct. 22, 2019

(54) RIBLETS FOR A FLOWPATH SURFACE OF A TURBOMACHINE

(71) Applicant: General Electric Company, Schenectady, NY (US)

(72) Inventor: Ronald Scott Bunker, West Chester, OH (US)

(73) Assignee: General Electric Company, Schenectady, NY (US)

( * ) Notice: Subject to any disclaimer, the term of this patent is extended or adjusted under 35 U.S.C. 154(b) by 413 days.

(21) Appl. No.: 15/042,635

(22) Filed: Feb. 12, 2016

(65) Prior Publication Data

US 2017/0234134 A1 Aug. 17, 2017

(51) Int. Cl.
*F01D 5/14* (2006.01)
*F01D 9/04* (2006.01)
(Continued)

(52) U.S. Cl.
CPC ............ *F01D 5/141* (2013.01); *F01D 5/145* (2013.01); *F01D 9/041* (2013.01); *F04D 29/324* (2013.01); *F04D 29/542* (2013.01); *F04D 29/681* (2013.01); *F15D 1/004* (2013.01); *F05D 2220/32* (2013.01); *F05D 2230/21* (2013.01);
(Continued)

(58) Field of Classification Search
CPC ..... B64C 21/10; B64C 2230/26; F01D 5/141; F01D 5/145; F01D 9/041; F04D 29/681; F04D 29/324; F04D 29/542; F05D 2220/32; F05D 2230/21; F05D 2230/90; F05D 2240/128; F05D 2240/31; F05D 2250/181; F05D 2250/182; F05D 2250/294; F05D 2250/61; F05D 2250/611; F05D 2250/90;
(Continued)

(56) References Cited

U.S. PATENT DOCUMENTS 2,238,749 A * 4/1941 Peltier ................... F04D 29/384
415/119
2,899,128 A * 8/1959 Vaghi .................... F04D 29/384
415/119

(Continued)

FOREIGN PATENT DOCUMENTS

| EP | 1 371 813 A1 | 12/2003 |
| JP | H08-247093 A | 9/1996 |
| WO | 2014/114988 A1 | 7/2014 |

OTHER PUBLICATIONS

Extended European Search Report and Opinion issued in connection with corresponding EP Application No. 17155413.2 dated Aug. 7, 2017.

(Continued)

*Primary Examiner* — William M McCalister
(74) *Attorney, Agent, or Firm* — Dority & Manning, P.A.

(57) ABSTRACT

A component stage for a turbomachine includes a component section. The component section includes a flowpath surface at least partially exposed to a core air flowpath defined by the turbomachine, when the component stage is installed in the turbomachine. The component further includes a plurality of sequentially arranged riblets on the flowpath surface, the plurality of sequentially arranged riblets customized for an anticipated location of the flowpath surface within the turbomachine by defining one or both of a non-uniform geometry or a non-uniform spacing.

11 Claims, 7 Drawing Sheets

(51) Int. Cl.
*F04D 29/68* (2006.01)
*F04D 29/32* (2006.01)
*F04D 29/54* (2006.01)
*F15D 1/00* (2006.01)

(52) U.S. Cl.
CPC .... *F05D 2230/90* (2013.01); *F05D 2240/128* (2013.01); *F05D 2240/31* (2013.01); *F05D 2250/181* (2013.01); *F05D 2250/182* (2013.01); *F05D 2250/294* (2013.01); *F05D 2250/61* (2013.01); *F05D 2250/611* (2013.01); *F05D 2250/90* (2013.01); *F05D 2260/22141* (2013.01); *F05D 2270/17* (2013.01); *Y02T 50/673* (2013.01)

(58) Field of Classification Search
CPC ....... F05D 2260/22141; F05D 2270/17; F15D 1/12; F15D 1/004; Y02T 50/673
See application file for complete search history.

(56) References Cited

U.S. PATENT DOCUMENTS

| | | | | |
|---|---|---|---|---|
| 3,193,185 | A * | 7/1965 | Erwin | F01D 5/145 |
| | | | | 415/193 |
| 3,584,812 | A * | 6/1971 | Brenman | B64C 21/025 |
| | | | | 244/130 |
| 3,776,363 | A * | 12/1973 | Kuethe | F01D 5/16 |
| | | | | 181/213 |
| 4,108,573 | A * | 8/1978 | Wagner | F01D 5/141 |
| | | | | 416/236 A |
| 4,128,363 | A * | 12/1978 | Fujikake | F01D 5/145 |
| | | | | 416/175 |
| 4,265,596 | A * | 5/1981 | Katagiri | F04D 29/384 |
| | | | | 416/175 |
| 5,368,508 | A * | 11/1994 | Whittington | B63H 1/26 |
| | | | | 416/236 A |
| 6,092,766 | A | 7/2000 | LaRoche et al. | |
| 6,213,711 | B1 | 4/2001 | Muller et al. | |
| 8,083,487 | B2 * | 12/2011 | Wood | F01D 5/141 |
| | | | | 416/223 R |
| 8,221,081 | B2 * | 7/2012 | Lebrun | B64C 11/18 |
| | | | | 416/129 |
| 8,632,357 | B2 | 1/2014 | Straka et al. | |
| 8,884,182 | B2 | 11/2014 | Lee et al. | |
| 8,939,410 | B2 * | 1/2015 | Exton | B64C 23/00 |
| | | | | 244/130 |
| 2007/0128042 | A1 * | 6/2007 | Weisse | B23P 15/04 |
| | | | | 416/233 |
| 2008/0273985 | A1 | 11/2008 | Fairbourn | |
| 2010/0127125 | A1 | 5/2010 | Li et al. | |
| 2011/0164981 | A1 | 7/2011 | Hardwicke | |
| 2011/0262705 | A1 | 10/2011 | Gupta et al. | |
| 2013/0146217 | A1 | 6/2013 | Kray et al. | |
| 2013/0164488 | A1 | 6/2013 | Wood et al. | |
| 2015/0003995 | A1 | 1/2015 | Xu | |

OTHER PUBLICATIONS

Machine Translation and First Office Action and Search issued in connection with corresponding CN Application No. 201710073703.0 dated Aug. 1, 2018.

* cited by examiner

RIBLETS FOR A FLOWPATH SURFACE OF A TURBOMACHINE

FIELD OF THE INVENTION

The present subject matter relates generally to a flowpath surface of a turbomachine including a plurality of riblets.

BACKGROUND OF THE INVENTION

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

The turbine section typically includes a plurality of sequentially arranged stage(s) of turbine nozzles and turbine rotor blades. Each of the turbine nozzles within the various stages of turbine nozzles and each of the turbine rotor blades within the various stages of turbine rotor blades include one or more flowpath surfaces. In order to, e.g., decrease a heat load of certain of these flowpath surfaces, riblets (i.e., small ribs or fins) may be incorporated into the flowpath surface. Given a complexity associated with incorporating the riblets into the flowpath surfaces, each of the sequential riblets conventionally define a uniform geometry and spacing.

However, different flowpath surfaces within, e.g., the turbine section are exposed to different airflow conditions. The inventor of the present disclosure has found that the different airflow conditions react differently to the uniform riblets. For example, the riblets may be beneficial given the airflow conditions at a first flowpath surface, while the riblets may actually provide detrimental effects given the airflow conditions at a second flowpath surface.

Accordingly, the inventor of the present disclosure has discovered that it may be beneficial to customize the plurality of riblets to a specific location within the gas turbine engine at which the flowpath surface is located. More specifically, a flowpath surface for a gas turbine engine having a plurality of riblets customized to the specific location within the gas turbine engine would be particularly beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure a component stage for a turbomachine defining a core air flowpath is provided. The component stage includes a component section. The component section includes a flowpath surface at least partially exposed to the core air flowpath and further comprising a plurality of sequentially arranged riblets on the flowpath surface. The plurality of sequentially arranged riblets define one or both of a non-uniform geometry or a non-uniform spacing.

In another exemplary embodiment of the present disclosure, a turbomachine is provided. The gas turbine engine includes a compressor section, and a turbine section in serial flow order and defining at least in part a core air flowpath. One of the compressor section or the turbine section includes a component stage. The component stage includes a component section. The component section includes a flowpath surface at least partially exposed to the core air flowpath and further including a plurality of sequentially arranged riblets on the flowpath surface. The plurality of sequentially arranged riblets define one or both of a non-uniform geometry or a non-uniform spacing.

In an exemplary aspect of the present disclosure, a method of forming a component section of a component stage for a compressor section or a turbine section of a turbomachine is provided. The turbomachine defines a core air flowpath. The method includes forming a base geometry of the component section. The base geometry includes a flowpath surface to be at least partially exposed to the core air flowpath. The method also includes forming a plurality of riblets on the flowpath surface of the base geometry of the component section using an additive manufacturing process, the plurality of riblets arranged sequentially and defining one or both of a non-uniform geometry or a non-uniform spacing.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
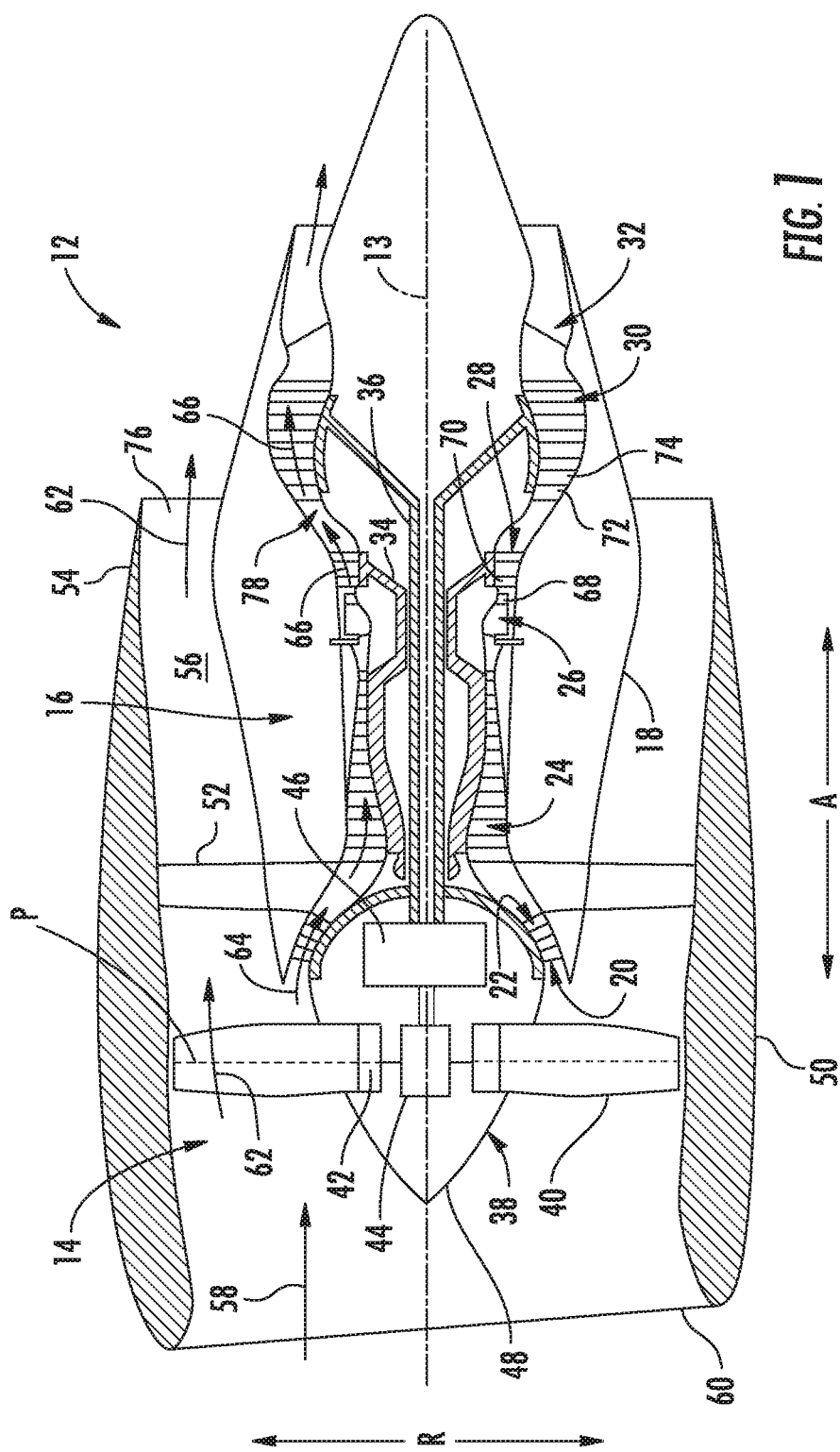
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic cross-sectional view of a turbomachine in accordance with an exemplary embodiment of the present disclosure. More particularly, for the embodiment of FIG. 1, the turbomachine is configured as a gas turbine engine, or rather as a high-bypass turbofan jet engine 12, referred to herein as "turbofan engine 12." As shown in FIG. 1, the turbofan engine 12 defines an axial direction A (extending parallel to a longitudinal centerline 13 provided for reference), a radial direction R, and a circumferential direction (not shown) extending about the axial direction A. In general, the turbofan 12 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases and the core turbine engine 16 includes, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. Accordingly, the LP shaft 36 and HP shaft 34 are each rotary components, rotating about the axial direction A during operation of the turbofan engine 12.

Referring still to the embodiment of FIG. 1, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40 in unison. The fan blades 40, disk 42, and pitch change mechanism 44 are together rotatable about the longitudinal axis 12 by LP shaft 36 across a power gear box 46. The power gear box 46 includes a plurality of gears for adjusting the rotational speed of the fan 38 relative to the LP shaft 36 to a more efficient rotational fan speed. More particularly, the fan section includes a fan shaft rotatable by the LP shaft 36 across the power gearbox 46. Accordingly, the fan shaft may also be considered a rotary component, and is similarly supported by one or more bearings.

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. The exemplary nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the turbofan engine 12, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 12 depicted in FIG. 1 is provided by way of example only, and that in other exemplary embodiments, the turbofan engine 12 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboprop engine, a turboshaft engine, or a turbojet engine. Further, in still other embodiments, aspects of the present disclosure may be incorporated into any other suitable turbomachine, including, without limitation, a steam turbine, a centrifugal compressor, and/or a turbocharger.

Figure 2:
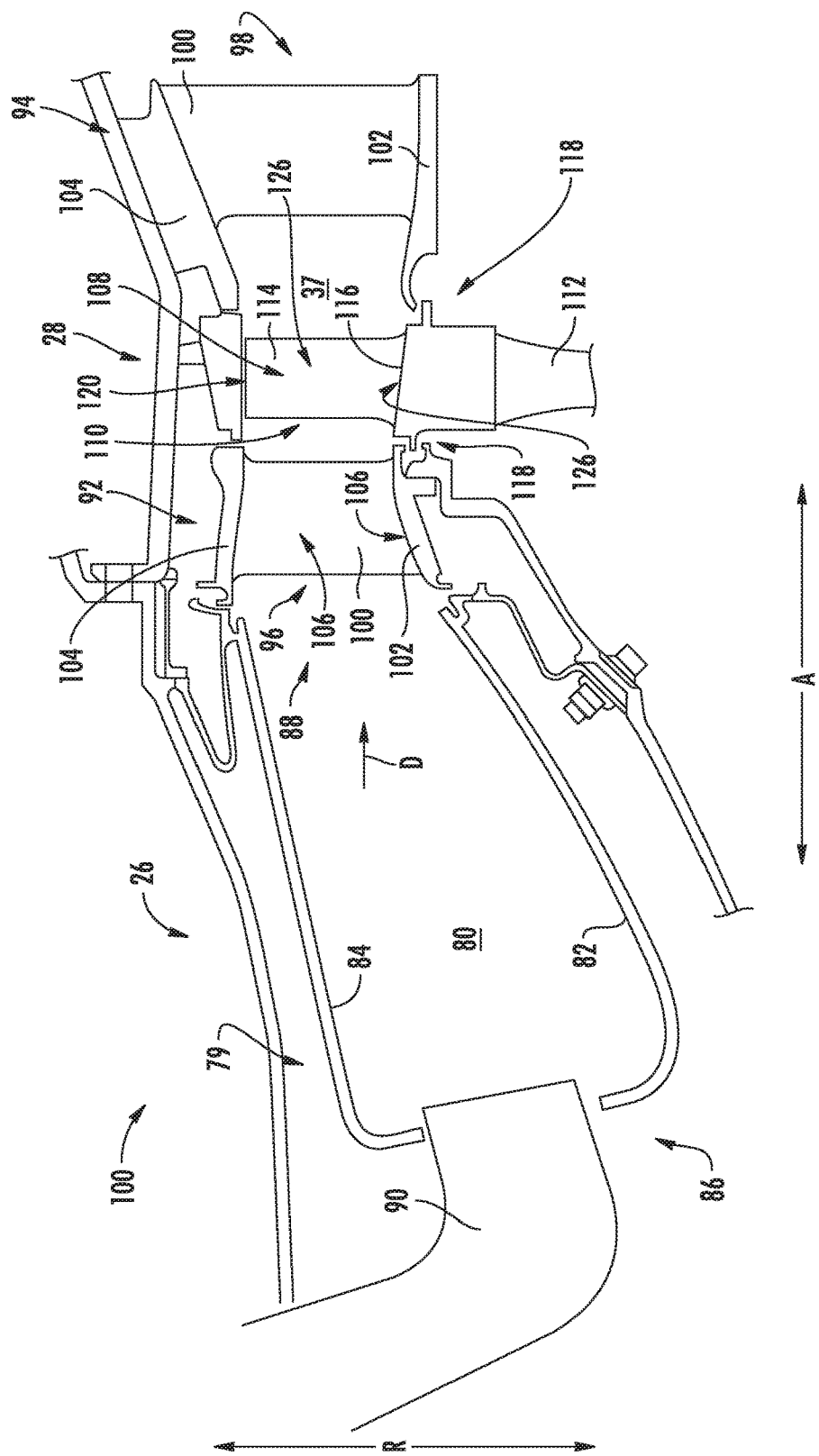
FIG. 2 is a close-up, side view of a combustion section and a turbine section of the exemplary gas turbine engine of FIG. 1.

Referring now to FIG. 2, a close-up, cross-sectional view is provided of the turbofan engine 10 of FIG. 1, and particularly of the combustion section 26 and the HP turbine 28 of the turbine section. The combustion section 26 depicted generally includes a combustor 79 having a combustion chamber 80 defined by an inner liner 82 and an outer liner 84, the combustion chamber 80 extending generally along the axial direction A from a forward end 86 to an aft end 88. A plurality of fuel nozzles 90 are positioned at the forward end 86 of the combustion chamber 80 for providing the combustion chamber 80 with a mixture of fuel and compressed air from the compressor section. As discussed above, the fuel and air mixture is combusted within the combustion chamber 80 to generate a flow of combustion gasses therethrough.

Downstream of the combustion section 26, the HP turbine 28 includes a plurality of turbine component stages, each turbine component stage comprising a plurality of turbine component sections. More particularly, for the embodiment depicted, the HP turbine 28 includes a plurality of turbine nozzle stages, as well as one or more stages of turbine rotor blades. Specifically, for the embodiment depicted, the HP turbine 28 includes a first turbine nozzle stage 92 and a second turbine nozzle stage 94, each configured to direct a flow of combustion gasses therethrough. The first turbine nozzle stage 92 includes a plurality of turbine nozzle sections 96 spaced along a circumferential direction C (a direction extending about the axial direction A; see FIG. 3). Notably, the first turbine nozzle stage 92 is located immediately downstream from the combustion section 26, and thus may also be referred to as a combustor discharge nozzle stage having a plurality of combustion discharge nozzle sections. Additionally, for the exemplary embodiment depicted, the second turbine nozzle stage 94 also includes a plurality of turbine nozzle sections 98 spaced along the circumferential direction C.

Each of the turbine nozzle sections 96, 98 forming the first and second turbine nozzle stages 92, 94 includes a turbine nozzle 100 positioned within the core air flowpath 37 and an endwall at least partially exposed to (and at least partially defining) the core air flowpath 37. More particularly, each nozzle section 96, 98 includes an inner endwall 102 and an outer endwall 104, with the nozzle 100 extending generally along the radial direction R from the inner endwall 102 to the outer endwall 104. The turbine nozzle 100, inner endwall 102, and outer endwall 104 each include a flowpath surface 106 at least partially exposed to the core air flowpath 37.

Located immediately downstream of the first turbine nozzle stage 92 and immediately upstream of the second turbine nozzle stage 94, the HP turbine 28 includes a first turbine rotor blade stage 108. The first turbine rotor blades stage 108 includes a plurality of turbine rotor blade sections 110 spaced along the circumferential direction C and a first stage rotor disk 112. The plurality of turbine rotor blade sections 110 are attached to the first stage rotor disk 112, and although not depicted, the turbine rotor disk 112 is, in turn, connected to the HP shaft 34 (see FIG. 1).

Figure 3:
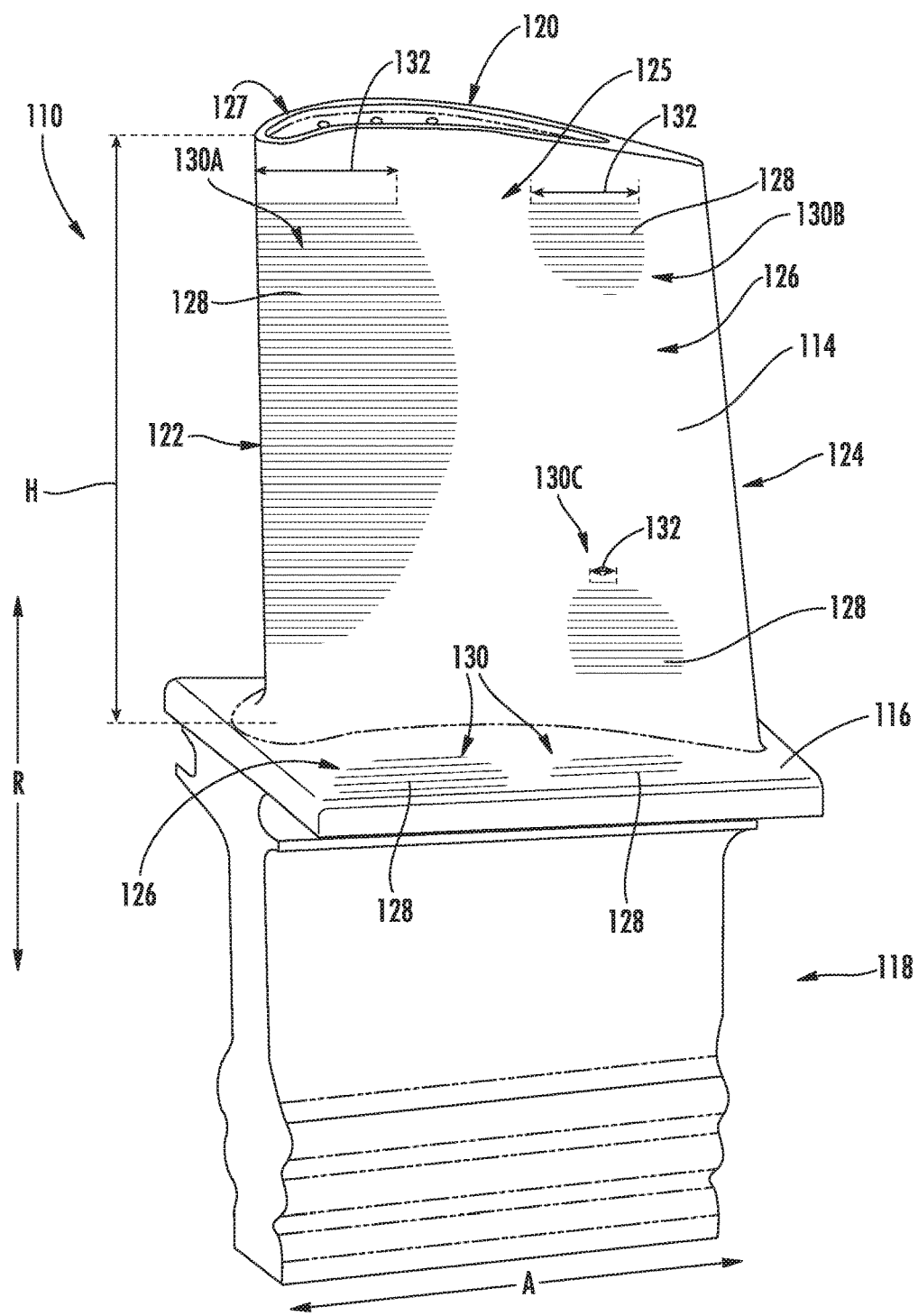
FIG. 3 provides a perspective view of a turbine rotor blade section in accordance with an exemplary embodiment of the present disclosure, the turbine rotor blade section configured for a turbine rotor blades stage of the turbine section of the exemplary gas turbine engine of FIG. 1.

Referring now also to FIG. 3, providing a perspective view of one of the plurality of turbine rotor blade sections 110, each of the plurality of turbine rotor blade sections 110 includes a turbine rotor blade 114, a wall or platform 116, and a base 118. The rotor blade 114 extends outwardly along the radial direction R (and along a span of the turbine rotor blade 114) from the platform 116 to a tip 120 of the rotor blade 114, defining a spanwise height H relative to the platform 116. Additionally, the turbine rotor blade 114 defines a leading edge 122 and an opposite trailing edge 124, as well as a pressure side 125 and an opposite suction side 127. During operation, hot combustion gases are generated in the combustion section and flow in a downstream direction D over the turbine rotor blades 114, extracting energy therefrom for rotating the rotor disk 112, which may in turn rotate the HP shaft 34.

Further, as with the plurality of nozzle sections 96, 98 discussed above, the turbine rotor blade section 110 includes a flowpath surface 126 at least partially exposed to the core air flowpath 37. More particularly, the turbine rotor blade 114 and the platform 116 each define a flowpath surface 126 at least partially exposed to (and at least partially defining) the core air flowpath 37. Moreover, the turbine rotor blade section 110 depicted further includes a plurality of sequentially arranged ridges or riblets 128 on the flowpath surface 126, the plurality of riblets 128 together forming a riblets grouping 130. For example, the exemplary turbine rotor blade section 110 depicted includes three groupings 130 of a plurality of sequentially arranged riblets 128 on the flowpath surface 126 of the turbine rotor blade 114. More particularly, the turbine rotor blade 114 depicted includes a first grouping 130A of riblets 128 located on the flowpath surface 126 of the turbine rotor blade 114 at the leading edge 122; a second grouping 130B of riblets 128 located on the flowpath surface 126 of the turbine rotor blade 114 on the pressure side 125 of the turbine rotor blade 114 proximate the tip 120; and a third grouping 130C of riblets 128 located on the flowpath surface 126 of the turbine rotor blade 114 on the pressure side 125 of the turbine rotor blade 114 proximate the platform 116. The rotor blade 114 may additionally include one or more groupings 130 on the suction side 127 (not shown). Further, the turbine rotor blade section 110 includes additional groupings 130 of sequentially arranged riblets 128 located on the flowpath surface 126 of the platform 116.

As will be discussed in greater detail below, the plurality of sequentially arranged riblets 128 define one or both of a non-uniform geometry or a non-uniform spacing. More particularly, the plurality of riblets 128 in each riblet grouping 130 define one or both of a non-uniform geometry or a non-uniform spacing 134. For example, as is depicted in FIG. 3, the first, second, and third groupings 130A, 130B, 130C of riblets 128 each extend generally in a first direction, or a longitudinal direction L (see FIG. 4), which for the embodiment depicted generally aligns with a downstream direction D. Additionally, for the embodiment depicted, the longitudinal direction L is a linear direction. However, as will be explained below, e.g., with reference to FIG. 10, in other embodiments, the longitudinal direction L may be a non-linear direction. Each riblet 128 in the groupings 130A, 130B, 130C defines a length 132 along the longitudinal direction L. The lengths 132 of the riblets 128 in each of the groupings 130A, 130B, 130C may vary as a function of the spanwise height H of the rotor blade 114. More particularly, the lengths 132 of adjacent riblets 128 in a given grouping 130A, 130B, 130C of riblets 128 is non-uniform.

Figure 4:
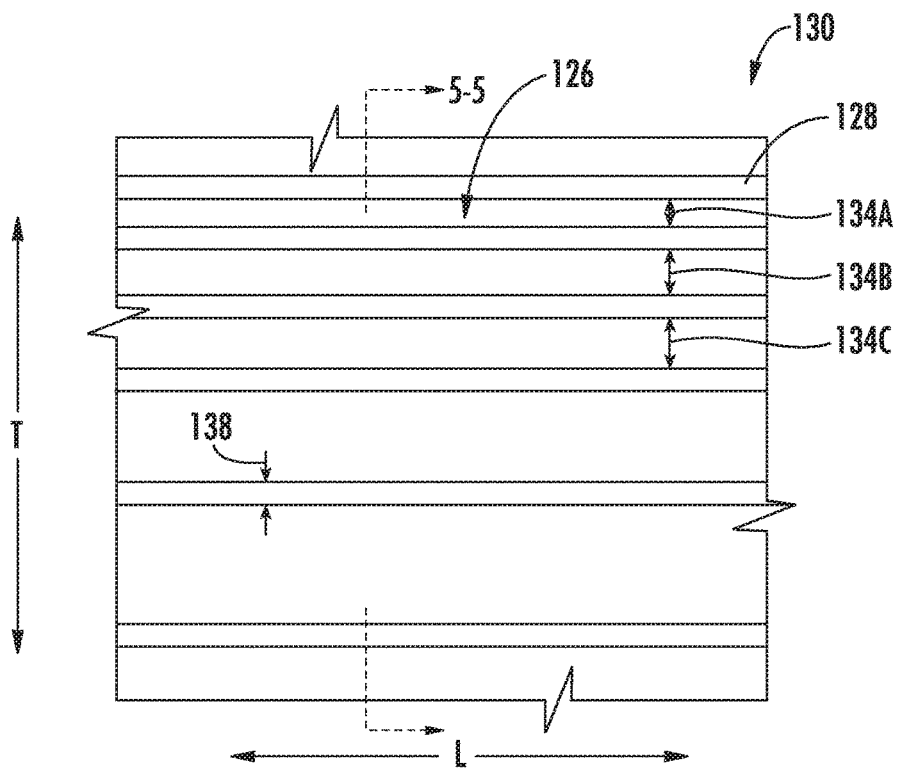
FIG. 4 provides a close-up, plane view of a plurality of riblets on a flowpath surface in accordance with an exemplary embodiment of the present disclosure.
Figure 5:
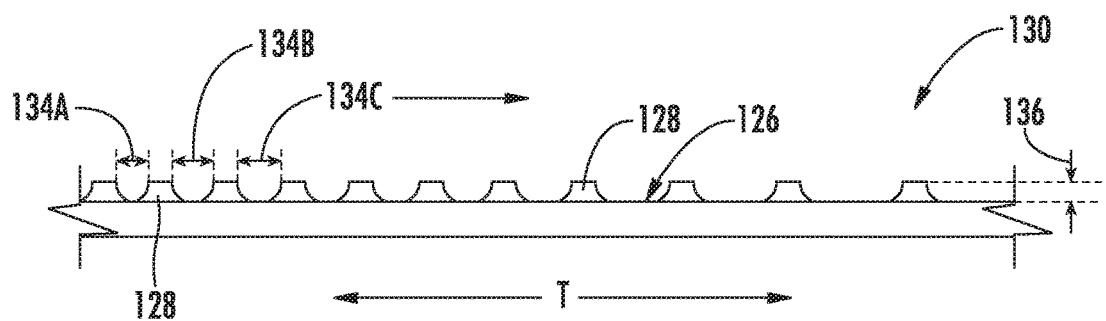
FIG. 5 provides a cross-sectional view of the exemplary plurality of riblets on the flowpath surface of FIG. 4, taken along Line 5-5 in FIG. 4.

Referring now to FIGS. 4 and 5, additional views of a plurality of riblets 128 on a flowpath surface 126 are provided. Specifically, FIG. 4 provides a close-up, plane view of a grouping 130 of a plurality of riblets 128 on a flowpath surface 126, and FIG. 5 provides a close-up, cross-sectional view of the grouping 130 of the plurality of riblets 128 on the flowpath surface 126 of FIG. 4, taken along Line 5-5 in FIG. 4. The flowpath surface 126 and grouping 130 of riblets 128 depicted in FIGS. 4 and 5 may be configured in substantially the same manner as one or more of the groupings 130 of riblets 128 on the flowpath surface 126 of the turbine rotor blade 114 and/or of the platform 116 described above with reference FIG. 3. Accordingly, the same or similar numbering may refer to the same or similar part.

The plurality of riblets 128 in the grouping 130 depicted extend generally in a first, longitudinal direction L, which may be a downstream direction D. The plurality of riblets 128 define one or both of a non-uniform geometry or a non-uniform spacing along a transverse direction T, i.e., a direction perpendicular to the longitudinal direction L and parallel to the flowpath surface 126. Specifically, for the embodiment depicted, the plurality of riblets 128 define a spacing 134 between adjacent riblets 128 along the transverse direction T, and the spacing 134 defined by the plurality of riblets 128 is non-uniform along the transverse direction T. More particularly, the plurality of riblets 128 defines a plurality of sequential spacings 134 (e.g., a first spacing 134A, a second spacing 134B, a third spacing 134C, etc.). One or more of the plurality of sequential spacings 134A, 134B, 134C is distinct from an adjacent spacing. Or, more particularly, for the embodiment depicted the first spacing 134A is distinct from the second spacing 134B, and the second spacing 134B is distinct from the third spacing 134C.

Figure 6:
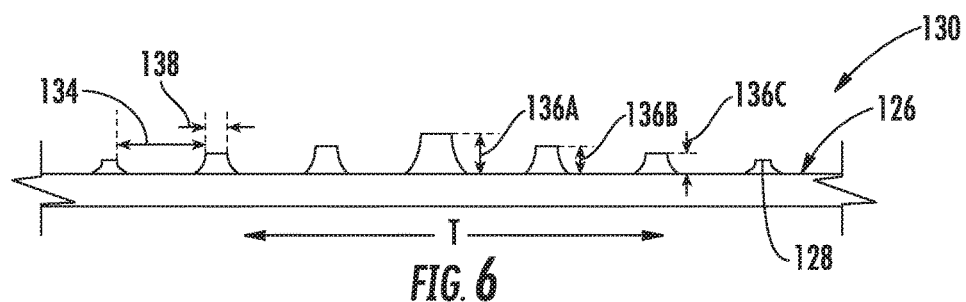
FIG. 6 provides a cross-sectional view of a plurality of riblets on a flowpath surface in accordance with another exemplary embodiment of the present disclosure.
Figure 7:
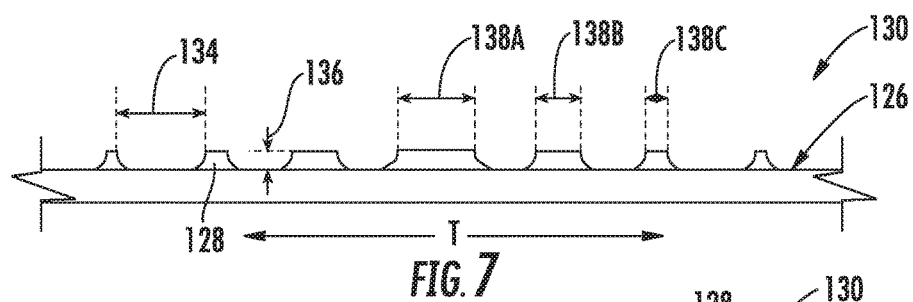
FIG. 7 provides a cross-sectional view of a plurality of riblets on a flowpath surface in accordance with yet another exemplary embodiment of the present disclosure.

Moreover, referring now to FIGS. 6 and 7, views of two additional embodiments of a grouping 130 of a plurality of riblets 128 on a flowpath surface 126 are provided. Specifically, FIG. 6 provides a close-up, cross-sectional view of a grouping 130 of a plurality of riblets 128 on a flowpath surface 126 in accordance with one exemplary embodiment of the present disclosure, and FIG. 7 provides a close-up, cross-sectional view of a grouping 130 of a plurality of riblets 128 on a flowpath surface 126 in accordance with another exemplary embodiment of the present disclosure. The embodiments of FIGS. 6 and 7 may be configured in substantially the same manner as one or more of the grouping 130 of the plurality of riblets 128 on the flowpath surface 126 of the turbine rotor blade 114 and/or of the platform 116 described above with reference FIG. 3. Accordingly, the same or similar numbering may refer to the same or similar part.

Specifically, each of the exemplary embodiments of FIGS. 6 and 7 also include a grouping 130 of a plurality of riblets 128 extending generally in a first, longitudinal direction L, which may be a downstream direction D. As with the embodiment of FIGS. 4 and 5, the plurality of riblets 128 depicted in FIGS. 6 and 7 define one or both of a non-uniform geometry or a non-uniform spacing along a direction perpendicular to the longitudinal direction L and parallel to the flowpath surface 126, i.e., a transverse direction T. More particularly, for the embodiment depicted, each of the plurality of riblets 128 define a height 136 relative to the flowpath surface 126 and a width 138 in the transverse direction T. For the embodiments of FIGS. 6 and 7, at least one of the height 136 or width 138 of each of the plurality of riblets 128 is non-uniform along the transverse direction T.

Referring particularly to FIG. 6, the heights 136 of each of the plurality of riblets 128 is non-uniform along the transverse direction T. More particularly, each sequential riblet 128 in the grouping 130 depicted defines a height 136 relative to the flowpath surface 126 (e.g., a first height 136A, a second height 136B, a third height 136C, etc.). The heights 136A, 136B, 136C of one or more of the plurality of sequential riblets 128 is distinct from an adjacent height. Specifically, for the embodiment depicted, the first height 136A is greater than the second height 136B, which is in turn greater than the third height 136C).

Additionally, referring now particularly to FIG. 7, the widths 138 of each of the plurality of riblets 128 is also non-uniform along the transverse direction T. More particularly, each sequential riblet 128 defines a width 138 (e.g., a first width 138A, a second width 138B, a third width 138C, etc.). The widths 138A, 138B, 138C of one or more of the plurality of sequential riblets 128 is distinct from an adjacent width. Specifically, the first width 138A is greater than the second width 138B, which is, in turn, greater than the third width 138C.

Notably, referring again briefly to FIG. 3, when the grouping 130 of the plurality of riblets 128 is on the flowpath surface 126 of the rotor blade 114, at least one of the height 136, the width 138, the length 132, or spacing 134 (collectively "dimensions") of the plurality of riblets 128 may vary as a function of the spanwise height H of the rotor blade 114. For example, the plurality of riblets 128 in the first grouping 130A may define a first dimension proximate the platform 116 of the rotor blade 114, a second dimension proximate a center portion of the rotor blade 114 (e.g. along the radial direction R), and a third dimension proximate the tip 120 of the rotor blade 114.

Additionally, in certain exemplary embodiments, each riblet 128 in the plurality of riblets 128 may be sized according to an anticipated average thickness $T_{BL}$ of the local boundary layer during full load operation of a gas turbine engine into which the component is installed. For example, each riblet 128 may define a height 136 of up to about two times the thickness $T_{BL}$. For example, in certain exemplary embodiments each riblet 128 in the plurality of riblets 128 may define a height 136 of up to about 1.5 times the thickness $T_{BL}$, or about equal to or less than the thickness $T_{BL}$. Additionally, each riblet in the plurality of riblets may define a width 138 of up to about two times the thickness $T_{BL}$. For example, in certain exemplary embodiments each riblet 128 in the plurality of riblets 128 may define a width 138 of up to about 1.5 times the thickness $T_{BL}$, or about equal to or less than the thickness $T_{BL}$. Further, each pair of adjacent riblets 128 in the plurality of riblets 128 may define a spacing 134 of up to about five times the thickness $T_{BL}$. For example, in certain exemplary embodiments each pair of adjacent riblets 128 in the plurality of riblets 128 may define a spacing 134 of up to about three times the thickness $T_{BL}$, up to about two times the thickness $T_{BL}$, or about equal to or less than the thickness $T_{BL}$.

Furthermore, when one or more the above dimensions of one or more riblets 128 within a given plurality of riblet 128 is described herein as being "non-uniform", such may refer to a least a 10% difference from a maximum of such dimension to a minimum of such dimension. For example, in certain embodiments, when one or more of the above dimensions within a given plurality of riblets 128 is described as being non-uniform, such may refer to at least a 20% difference, at least a 30% difference, or at least a 50% difference from a maximum of such dimension to a minimum of such dimension. However, in still other embodiments, for example when a minimum of such dimension approaches zero, a difference between a maximum of such dimension and a minimum of such dimension may be approximately 100%.

Moreover, it should be appreciated that although the dimensions above are shown with the riblets 120 defining a substantially squared or rectangular cross-sectional shape, the above parameters may apply to other embodiments of the present disclosure, wherein one or more of the riblets define any other suitable shape, such as a rounded shape, a parabolic shape, or a sawtooth shape (lambda shape). In such exemplary embodiments, the height 136 of the riblets 128 may refer to a peak height, the width 138 of the riblets 128 may refer to an average width, and a spacing 134 may refer to a spacing between peaks of adjacent riblets 128.

Figure 8:
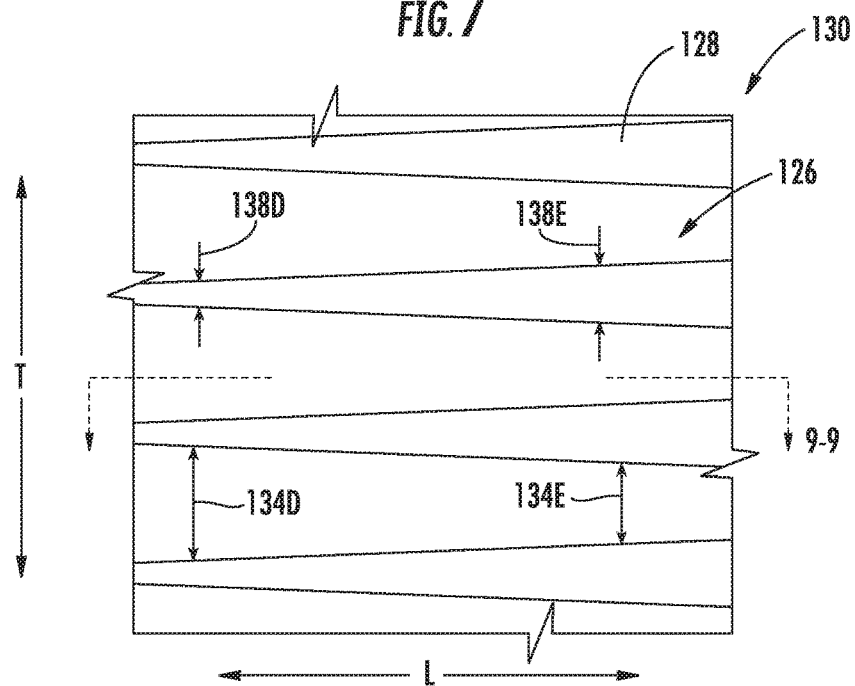
FIG. 8 provides a close-up, plane view of a plurality of riblets on a flowpath surface in accordance with still another exemplary embodiment of the present disclosure.
Figure 9:
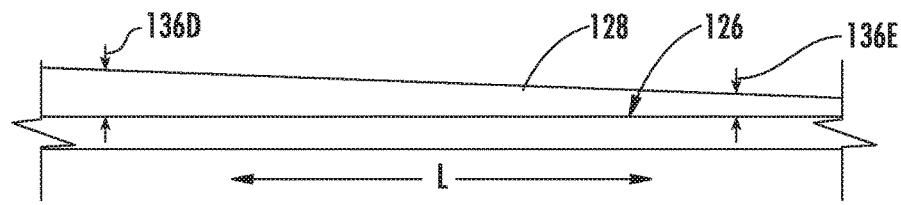
FIG. 9 provides a cross-sectional view of a riblet of the plurality of riblets of FIG. 8, taken along Line 9-9 in FIG. 8.

Referring now to FIGS. 8 and 9, views are provided of a grouping 130 of a plurality of riblets 128 on a flowpath surface 126 in accordance with yet another exemplary embodiment of the present disclosure. More particularly, FIG. 8 provides a close-up, plane view of a grouping 130 of a plurality of riblets 128 on a flowpath surface 126, and FIG. 9 provides a side, cross-sectional view of a riblet 128 in the grouping 130 of the plurality of riblets 128 on the flowpath surface 126 of FIG. 8, along Line 9-9 of FIG. 8. The embodiments of FIGS. 8 and 9 may also be configured in substantially the same manner as one or more of the groupings 130 of the plurality of riblets 128 on the flowpath surface 126 of the turbine rotor blade 114 and/or of the plurality of riblets 128 on the platform 116 described above with reference FIG. 3. Accordingly, the same or similar numbering may refer to the same or similar part.

For the exemplary embodiment of FIGS. 8 and 9, each of the plurality of riblets 128 in the grouping 130 depicted extend generally in a first, longitudinal direction L, which may be a downstream direction D. Additionally, each of the plurality of riblets 128 in the grouping 130 on the flowpath surface 126 define one or both of a non-uniform geometry or a non-uniform spacing along the longitudinal direction L.

Specifically, for the embodiment depicted, each of the plurality of riblets 128 in the grouping 130 depicted defines a height 136 relative to the flowpath surface 126 and a width 138. At least one of the height 136 or the width 138 of each of the plurality of riblets 128 is non-uniform along the longitudinal direction L. Particularly for the embodiment depicted, both the height 136 and the width 138 of each of the plurality of riblets 128 is non-uniform along the longitudinal direction L. For example, referring particularly to FIG. 8, a first riblet 128 defines an upstream width 138D (i.e., a width 138D at a first location along longitudinal direction L) and a downstream width 138E (i.e., a width 138E at a second location along the longitudinal direction L). The upstream width 138D is not equal to the downstream width 138E, and more particularly, the upstream width 138D is less than the downstream width 138E. Accordingly, the exemplary first riblet 128 flares outwardly/widens as it extends along the longitudinal direction L (it being appreciated that in other embodiments, the first riblet 128 may instead narrow as it extends along the longitudinal direction).

Additionally, referring now particularly to FIG. 9, the first riblet 128 additionally defines an upstream height 136D (i.e., a height 136D at a first location along the longitudinal direction L) and a downstream height 136E (i.e., a height 136E at a second location along the longitudinal direction L). The upstream height 136D is not equal to the downstream height 136E, or more particularly, the upstream height 136D is greater than the downstream height 136E. Accordingly, the exemplary first riblet 128 slants towards the flowpath surface 126 as it extends along the longitudinal direction L (it being appreciated that in other embodiments, the first riblet 128 may instead slant away from the flowpath surface 126 as it extends along the longitudinal direction).

As is also depicted, the exemplary embodiment of FIGS. 8 and 9 additionally defines a non-uniform spacing. More particularly, each of the plurality of riblets 128 defines a spacing 134 with an adjacent riblet 128. The spacings 134 defined by the plurality of riblets 128 (i.e., between adjacent riblets 128) are non-uniform along the longitudinal direction L, or downstream direction. For example, a first and a second riblet 128 together define an upstream spacing 134D therebetween (i.e., a spacing 134D at a first location along the longitudinal direction L). The first and second riblet 128 also together define a downstream spacing 134E therebetween (i.e., a spacing 134E at a second location along the longitudinal direction L). The upstream spacing 134D defined by the first and second riblets 128 is not equal to the downstream spacing 134E defined by the first and second riblets 128, or more particularly, the upstream spacing 134D defined by the first and second riblets 128 is greater than the downstream spacing 134E defined by the first and second riblets 128. Accordingly, the first and second riblets 128 become closer to one another as they extend along the longitudinal direction L.

Inclusion of a plurality of riblets in accordance with one or more embodiments of the present disclosure may allow for a decrease in heat load for the component, and thus may assist with maintaining the component within a desired operating temperature range. Moreover, as will be appreciated, inclusion of a plurality of riblets in accordance with one or more embodiments of the present disclosure may also allow for a reduction in drag on a flowpath surface on which the plurality of riblets are positioned. Further, given that the riblets may have a non-uniform spacing and/or a non-uniform geometry along a direction in which they extend, or in a direction perpendicular to the direction in which they extend, the plurality of riblets may be customized for the specific type of airflow to which they will be exposed. For example, the riblets may be designed based on an anticipated amount of turbulence, airflow speed, etc. for the particular location within the gas turbine engine. Accordingly, the plurality of riblets may be designed to minimize an amount of thermal transfer, and/or minimize an amount of drag on a particular component.

Given the above benefits, it should be appreciated that although the plurality of riblets 128 described above with reference to FIGS. 2 through 7 are located on a flowpath surface 126 of a turbine rotor blade 114, in other exemplary embodiments, a plurality of riblets 128 may additionally, or alternatively, be positioned on a flowpath surface of any suitable component within the turbine section, as well as a flowpath surface of any suitable component within the compressor section. For example, in other exemplary embodiments, a grouping of a plurality of riblets may be positioned on the flowpath surface 106 of a nozzle 100 of a nozzle section (e.g., nozzle section 96 or nozzle section 98), an endwall of a nozzle section (e.g., one or both of the inner and outer end walls 102, 104 of the exemplary nozzle sections 96, 98), or any other suitable flowpath surface. Furthermore, in still other exemplary embodiments a grouping of a plurality of riblets in accordance with one or more exemplary aspects of the present disclosure may be located on a compressor rotor blade of a compressor rotor blade section in a stage of compressor rotor blades, and/or on a flowpath surface of a platform of a compressor rotor blades section, on a flowpath surface of a compressor nozzle, or an endwall of a compressor nozzle section of a compressor nozzle stage. Furthermore, in still other exemplary embodiments, riblets in accordance with one or more embodiments of the present disclosure may also be located on a flowpath surface of a jet nozzle exhaust section, such as the exemplary jet nozzle exhaust section 32 described above with to FIG. 1.

As will be discussed in greater detail below with reference to FIG. 11, a component section including a flowpath surface with a plurality of riblets 128 thereon in accordance with an exemplary aspect of the present disclosure may be formed by adding the plurality of riblets 128 to a base geometry of the component section. For example, the component section may include a base geometry, the base geometry including the flowpath surface. The base geometry of the component section may be formed by casting. However, in other embodiments, the base geometry may additionally, or alternatively, be formed using one or more other methods, such as machining, joining, and additive manufacturing. Subsequently, the grouping of the plurality of riblets 128 may be added to the flowpath surface using an additive manufacturing process (also known as rapid prototyping, rapid manufacturing, and 3D printing). For example, in certain exemplary aspects, the grouping of the plurality of riblets 128 may be added to the base geometry of the component section using selective laser sintering (SLS), direct metal laser sintering (DMLS), electron beam melting (EBM), diffusion bonding, or selective heat sintering (SHS). Accordingly, it should be appreciated that in certain exemplary embodiments, the riblets 128 may be formed of a material different than that of the base geometry. For example, the riblets 128 may be formed of a different alloy than that of the base geometry. However, in other embodiments, the riblets 128 may instead be formed of the same material.

Notably, in certain embodiments, the grouping 130 of the plurality of riblets 128 may completely cover a local section of the flowpath surface. For example, the grouping 130 of the plurality of riblets 128 may include thin connections between adjacent riblets 128. Alternatively, adding the plurality of riblets 128 to the flowpath surface 126 may include adding only the individual riblets 128, such that the flowpath surface between adjacent riblets is exposed.

Figure 10:
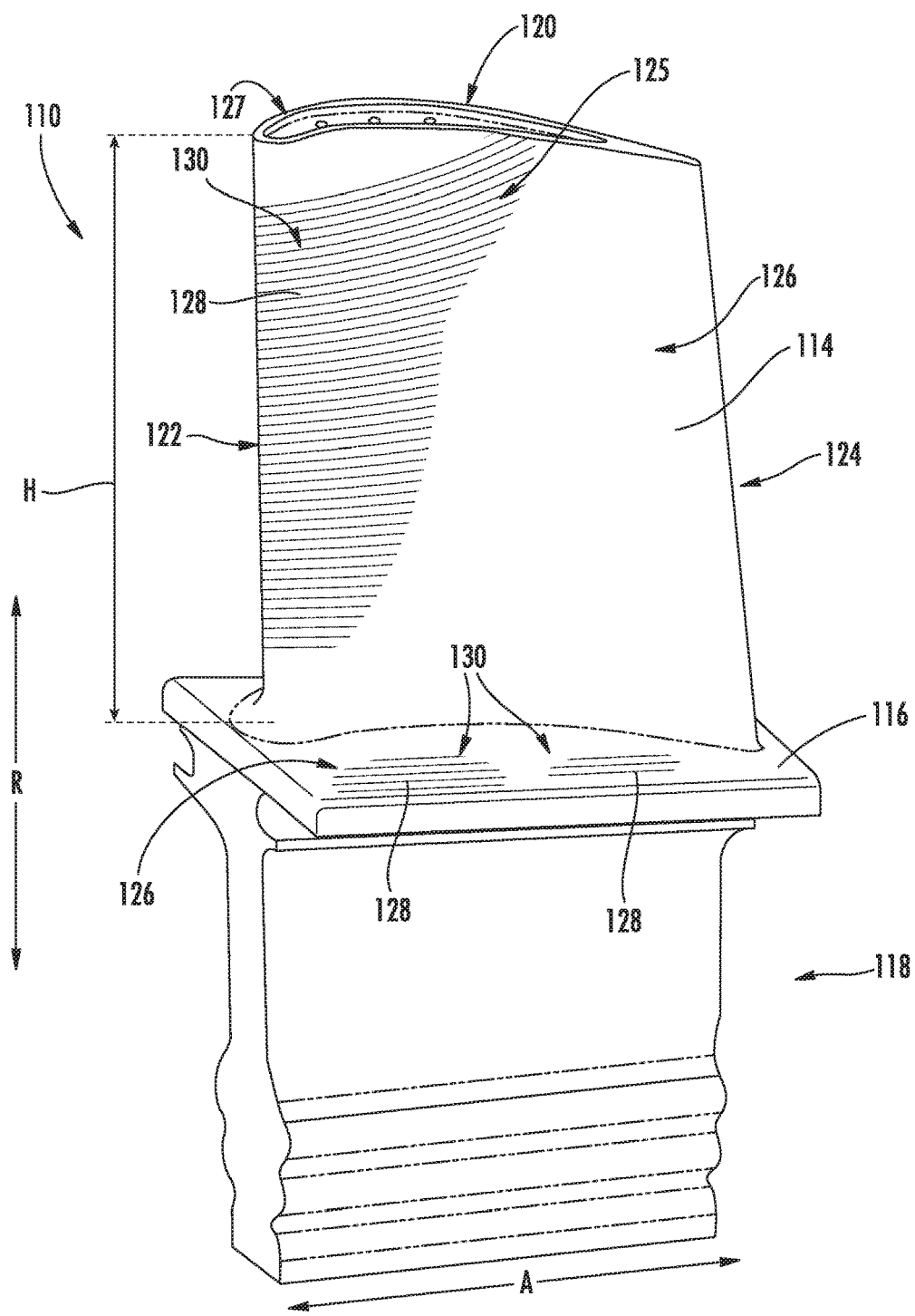
FIG. 10 provides a perspective view of a turbine rotor blade section in accordance with another exemplary embodiment of the present disclosure.

Referring now briefly to FIG. 10, a perspective view of a turbine rotor blade section 110 in accordance with another exemplary embodiment of the present disclosure is provided. The exemplary rotor blade section 110 depicted in FIG. 10 may be configured in substantially the same manner as exemplary rotor blade section 110 depicted in FIG. 3. Accordingly, the same or similar numerals may refer to same or similar part.

As depicted, the exemplary rotor blade section 110 of FIG. 10 includes a turbine rotor blade 114, a wall or platform 116, and a base 118. The rotor blade 114 extends outwardly along a radial direction R from the platform 116 to a tip 120 of the rotor blade 114. Additionally, the turbine rotor blade 114 defines a leading edge 122 and an opposite trailing edge 124. Further, the turbine rotor blade section 110 includes a flowpath surface 126 at least partially exposed to the core air flowpath 37. The turbine rotor blade section 110 depicted further includes a plurality of sequentially arranged ridges or riblets 128 on the flowpath surface 126. However, for the embodiment depicted, the exemplary riblets 128 extend in a non-linear direction along the flowpath surface 126 (i.e., the plurality of riblets 128 extend along a longitudinal direction, the longitudinal direction being a non-linear direction) and a portion of at least one of the riblets 128 on the leading edge 122 is substantially perpendicular to the leading edge 22 of the rotor blade 114.

Specifically, for the embodiment depicted, the exemplary rotor blade section 110 includes a plurality of riblets 128 extending in a non-linear direction from the leading edge 122 towards the tip 120. As is depicted, the exemplary group 130 of riblets 128 extending in the non-linear direction from a radially outward half of the rotor blade 114 towards the tip 120. It should be appreciated, that although not included in the exemplary embodiment depicted, the rotor blade section 110 may additionally, or alternatively, include a plurality of riblets 128 extending in a non-linear direction at any other location. For example, a root section (i.e., a radially inner end) on the suction side 127 of the rotor blade 114 may include riblets 128 extending in a non-linear direction. Further, for other exemplary embodiments, e.g., wherein a nozzle section includes a plurality of riblets 128 on a nozzle (e.g., nozzle 100), a plurality of riblets 128 on an aft, suction side of the nozzle may extend non-linearly from an endwall region (inner or outer) towards a midspan region of the nozzle. Of course, in still other embodiments, the riblets 128 may extend in any suitable direction (linear or non-linear).

A rotor blade section configured in such an exemplary manner to include a plurality of riblets 128 extending in a non-linear direction may allow for the plurality of riblets 128 to extend generally along the flowlines or streamlines of the component during operation, further reducing a drag on the component.

Figure 11:
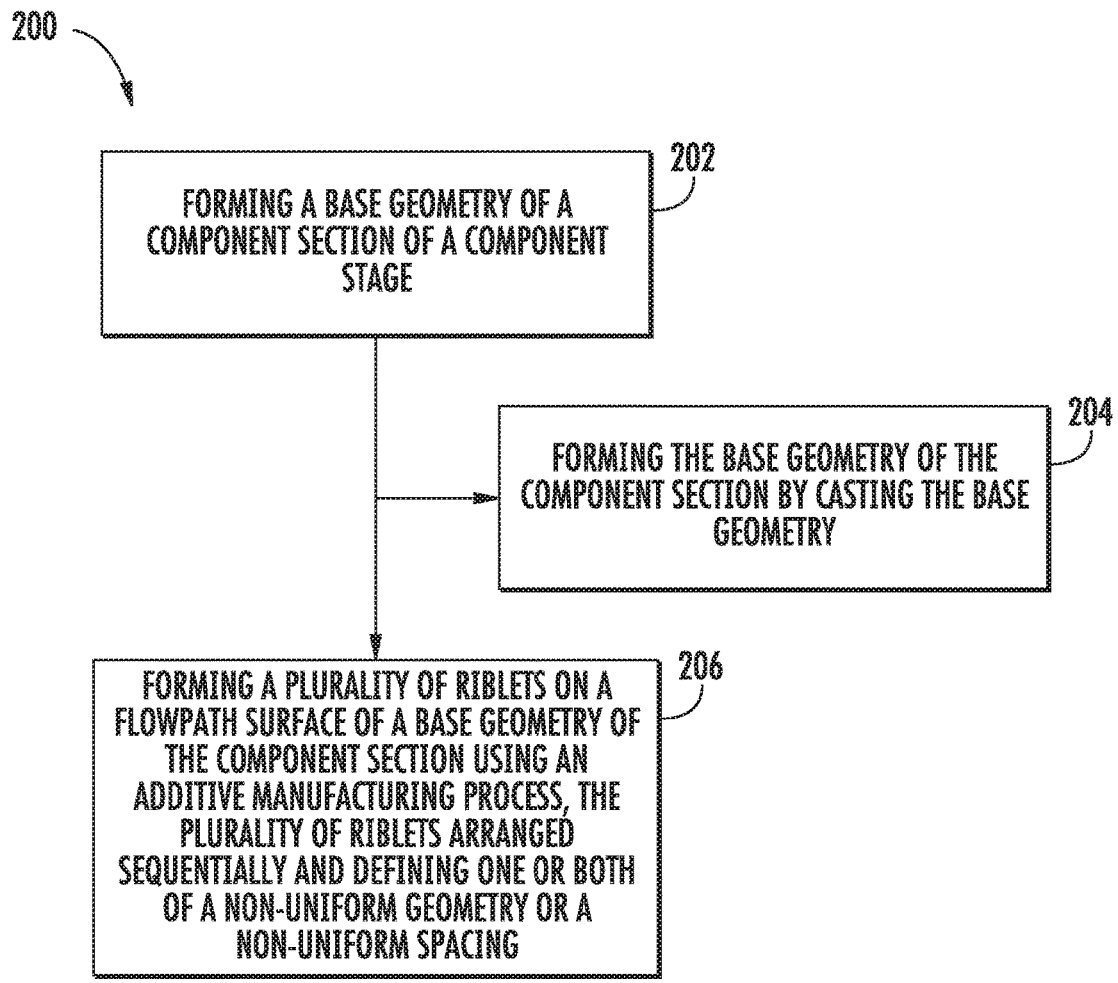
FIG. 11 provides a flow diagram of a method of forming a component section in accordance with an exemplary aspect of the present disclosure.

Referring now to FIG. 11, a flowchart of an exemplary method (200) of forming a component section of a component stage for a compressor section or a turbine section of a gas turbine engine is provided. The exemplary method (200) may be utilized with the exemplary gas turbine engine described above with reference to FIGS. 1 and 2. Accordingly, the gas turbine engine may define a core air flowpath.

As is depicted, the exemplary method (200) includes at (202) forming a base geometry of the component section. The base geometry includes a flowpath surface to be at least partially exposed to the core air flowpath when the component section is installed in the gas turbine engine. For the exemplary embodiment depicted, forming the base geometry of the component section at (202) includes at (204) forming the base geometry of the component section by casting the base geometry.

Further, the exemplary method (200) additionally includes at (206) forming a plurality of riblets on the flowpath surface of the base geometry of the component section using an additive manufacturing process. The plurality of riblets are arranged sequentially and define one or both of a nonuniform geometry or a nonuniform spacing. For example, in certain exemplary aspects, the riblets formed at (206) may be configured in the same manner as one or more of the exemplary embodiments described above with reference to FIGS. 3 through 9. Accordingly, inclusion of the plurality of riblets formed at (206) may, e.g., increase a heat transfer for the component, and/or decrease a drag on the component during operation.

Notably, in other exemplary embodiments, the exemplary method (200) may instead be used during a repair of the component. With such an exemplary aspect, instead of forming the base geometry of the component by casting at (204), forming at (202) the base geometry the component may include removing one or more layers of coatings previously applied to the flowpath surface of the base geometry. For example, a component to be repaired may be stripped down of any environmental barrier coatings or other coatings previously applied thereto. Additionally, any damaged aspects of the component may be removed and repaired, e.g., by brazing, or alternatively may be repaired also using an additive manufacturing process. The exemplary method (200) may then include at (206) forming the plurality of riblets on the flowpath surface of the base geometry the component using an additive manufacturing process.

Referring still to FIG. 11, the exemplary method additionally includes at (208) applying one or more layers of coatings to the flowpath surface of the base geometry and the plurality of riblets formed on the flowpath surface of the base geometry. The one or more layers of coatings may include an environmental barrier coating, or any other suitable coating.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A component stage for a turbomachine defining a core air flowpath, the component stage comprising:
a component section, the component section comprising a flowpath surface at least partially exposed to the core air flowpath and further comprising a plurality of sequentially arranged riblets on the flowpath surface, the plurality of sequentially arranged riblets defining one or both of a non-uniform geometry or a non-uniform spacing;
wherein each of the plurality of riblets extend generally in a first direction, wherein each of the plurality of riblets include a top, and wherein the tops of each of the plurality of riblets define a width, and wherein the widths of the tops of the plurality of riblets is non-uniform along the first direction; and
wherein the component section comprises a rotor blade defining a leading edge and a tip, wherein the flowpath surface of the component section comprises a surface of the rotor blade, and wherein the plurality of riblets extend in a non-linear direction from the leading edge towards the tip; and
wherein the rotor blade further defines a pressure side and a suction side, wherein one of the plurality of riblets is on the pressure side.

2. The component stage of claim 1, wherein each of the plurality of riblets extend generally in a first direction, and wherein each of the plurality of riblets define one or both of a non-uniform geometry or a non-uniform spacing along the first direction.

3. The component stage of claim 1, wherein the plurality of riblets define a spacing between adjacent riblets, and wherein the spacing defined by the plurality of riblets is non-uniform along the first direction; and
wherein each of the plurality of sequentially arranged riblets are raised features on the flowpath surface.

4. The component stage of claim 1, wherein the plurality of riblets extend generally in the first direction, and wherein the plurality of riblets define one or both of a non-uniform geometry or a non-uniform spacing in a direction perpendicular to the first direction.

5. The component stage of claim 1, wherein the component section comprises at least one of a nozzle or a rotor blade, and wherein the flowpath surface of the component section comprises a surface of the nozzle or the rotor blade.

6. The component stage of claim 1, wherein the component section comprises a base geometry, wherein the base geometry comprises the flowpath surface, wherein the base geometry is formed by casting, and wherein the plurality of riblets are added to the flowpath surface using an additive manufacturing process.

7. A turbomachine comprising:
a compressor section and a turbine section in serial flow order and defining at least in part a core air flowpath, one of the compressor section or the turbine section comprising a component stage, the component stage comprising a component section, the component section comprising a flowpath surface at least partially exposed to the core air flowpath and further comprising a plurality of sequentially arranged riblets on the flowpath surface, the plurality of sequentially arranged riblets defining a non-uniform geometry relative to one another; and
wherein the component section comprises a rotor blade defining a leading edge and a tip, wherein the flowpath surface of the component section comprises a surface of the rotor blade, and wherein the plurality of riblets extend in a non-linear direction from the leading edge towards the tip;
wherein the rotor blade further defines a pressure side and a suction side, wherein one of the plurality of riblets is on the pressure side.

8. The component stage of claim 1, wherein the tops of each of the plurality of riblets are substantially flat along the first direction; and
wherein each of the plurality of sequentially arranged riblets are raised features on the flowpath surface.

9. The turbomachine of claim 7, wherein each of the plurality of riblets extend generally in a first direction, wherein the plurality of riblets define a spacing between adjacent riblets, and wherein the spacing defined by the plurality of riblets is non-uniform along the first direction; and
wherein each of the plurality of sequentially arranged riblets are raised features on the flowpath surface.

10. The turbomachine of claim 7, wherein the plurality of riblets extend generally in a first direction, and wherein the plurality of riblets define one or both of a non-uniform geometry or a non-uniform spacing in a direction perpendicular to the first direction.

11. The turbomachine of claim 7, wherein the component section comprises at least one of a nozzle or a rotor blade, and wherein the flowpath surface of the component section comprises a surface of the nozzle or the rotor blade.

* * * * *